Figure 1:
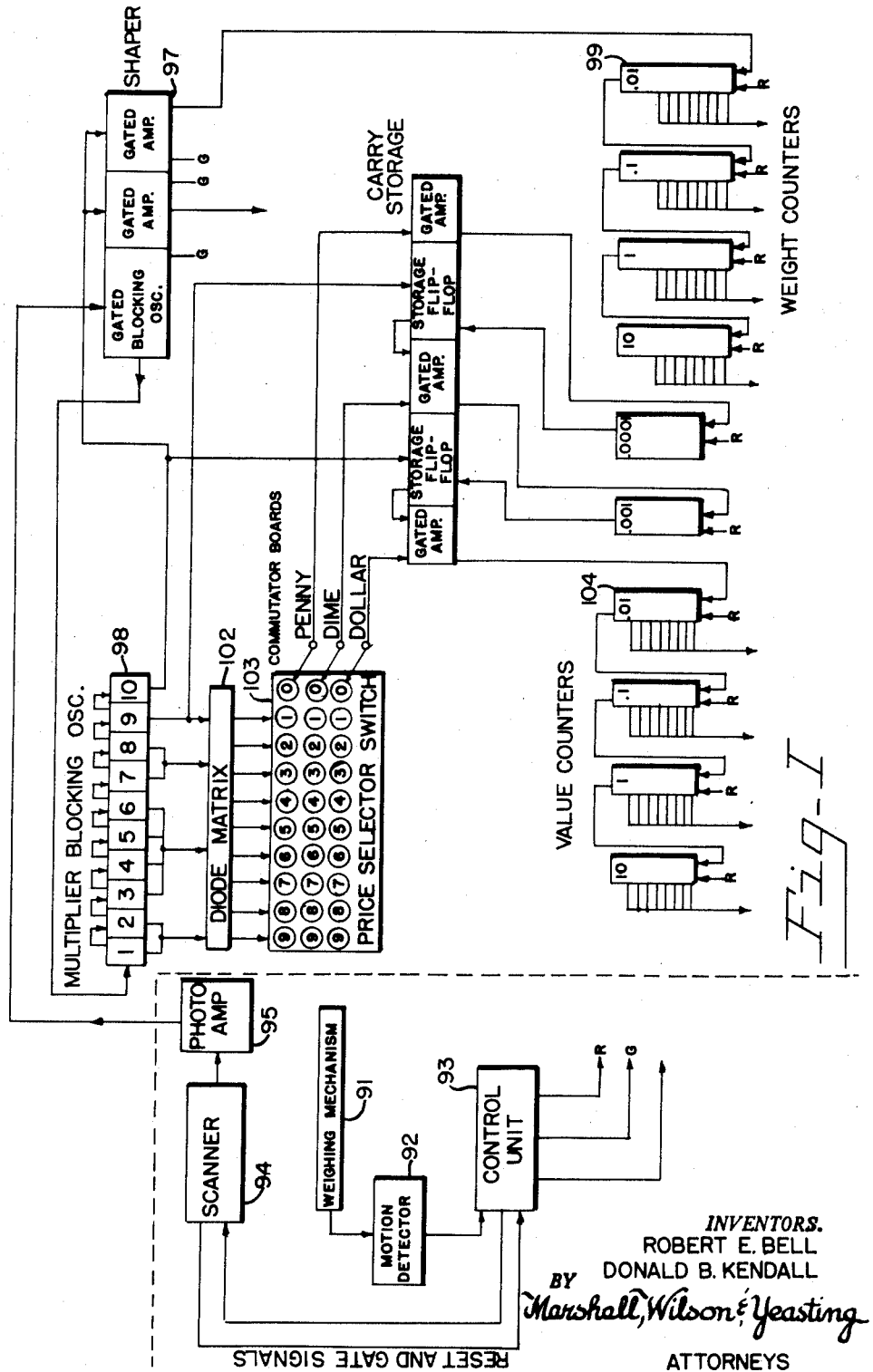

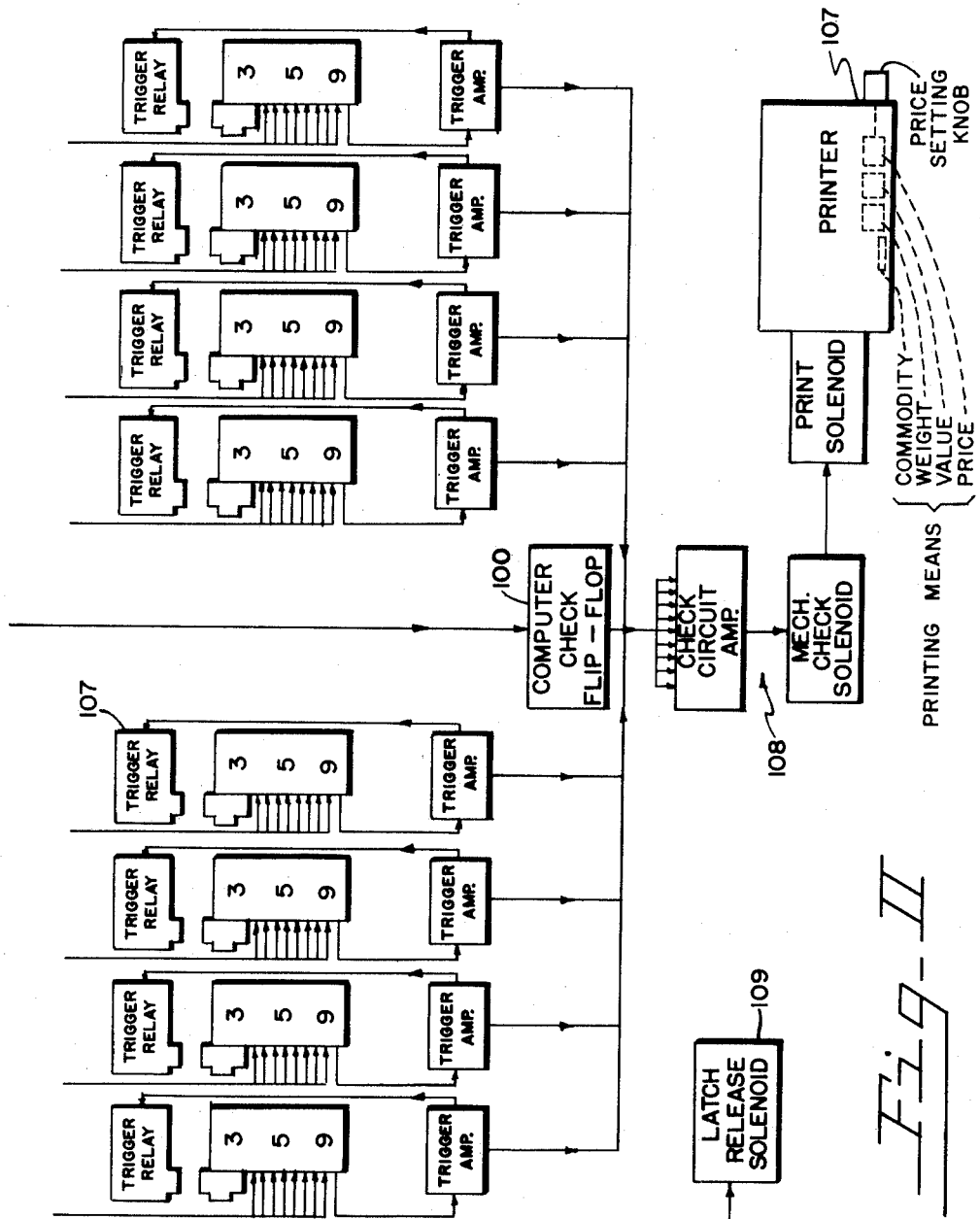

Sept. 14, 1965    R. E. BELL ETAL    3,205,957
WEIGHING SCALE
Original Filed Feb. 28, 1961    7 Sheets-Sheet 3
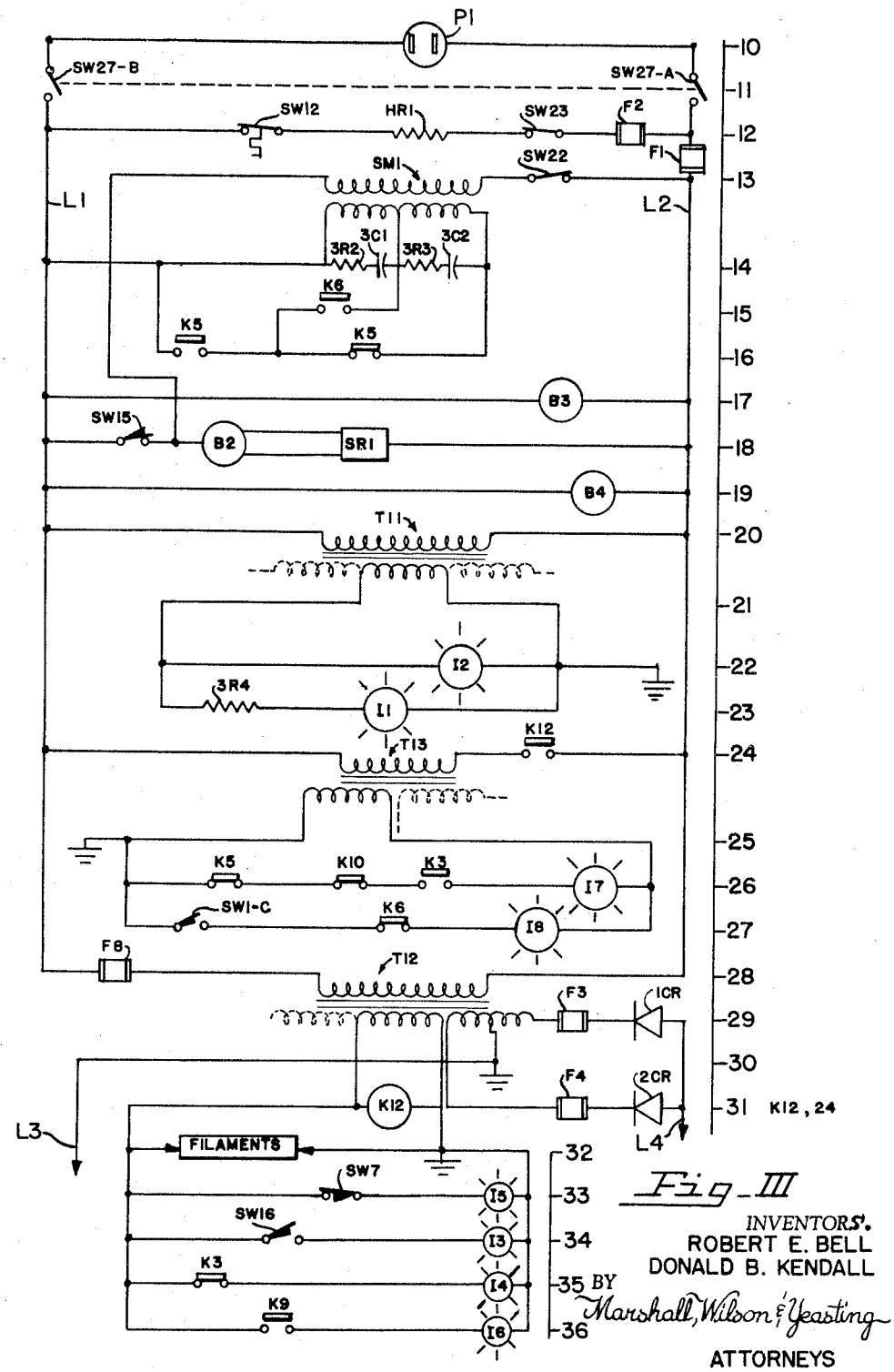
Fig. III
INVENTORS.
ROBERT E. BELL
DONALD B. KENDALL
BY Marshall, Wilson & Yeasting
ATTORNEYS

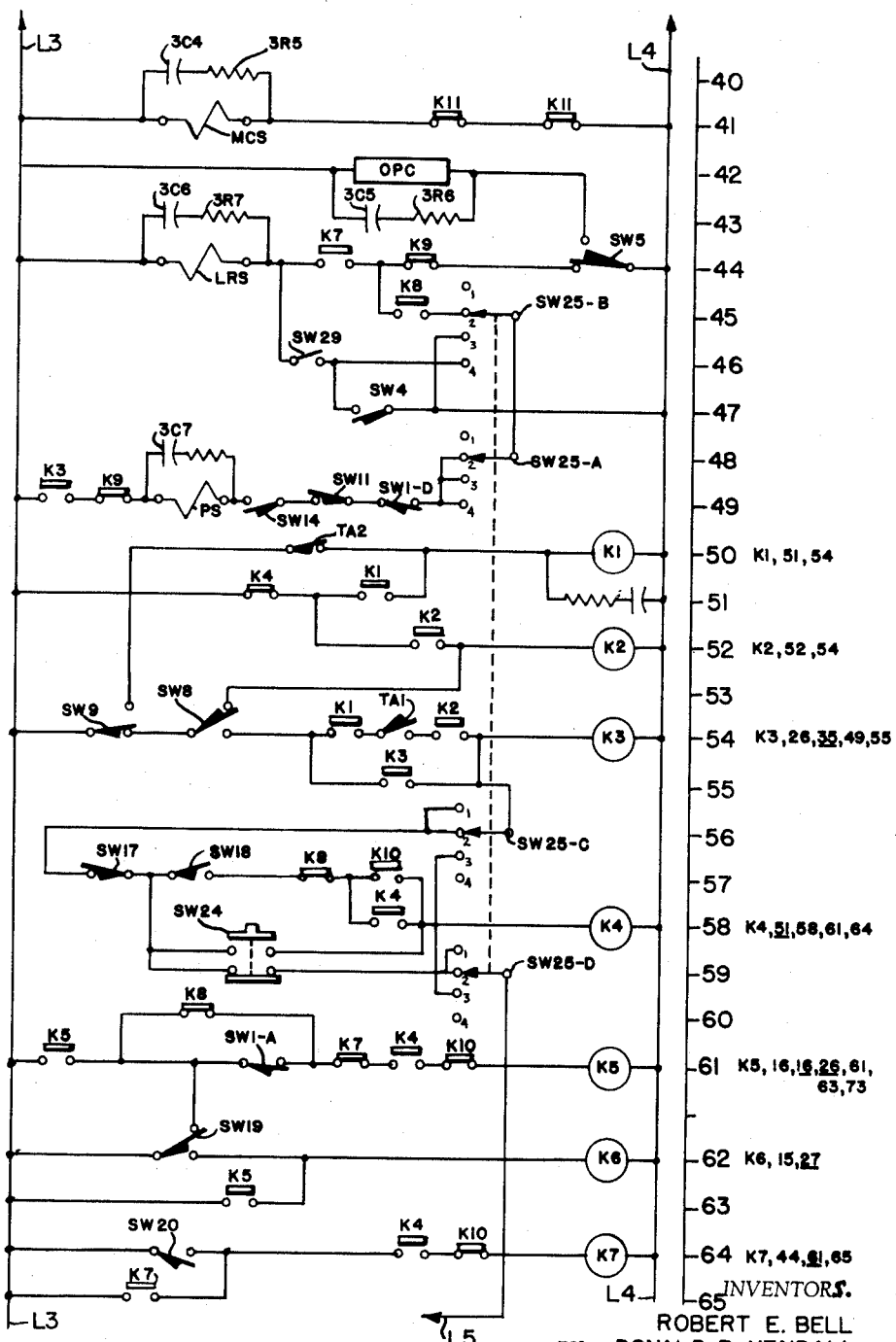
Fig. IV

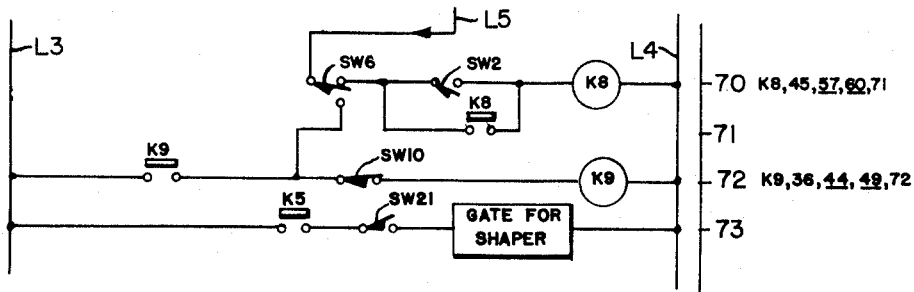
*Fig. V*
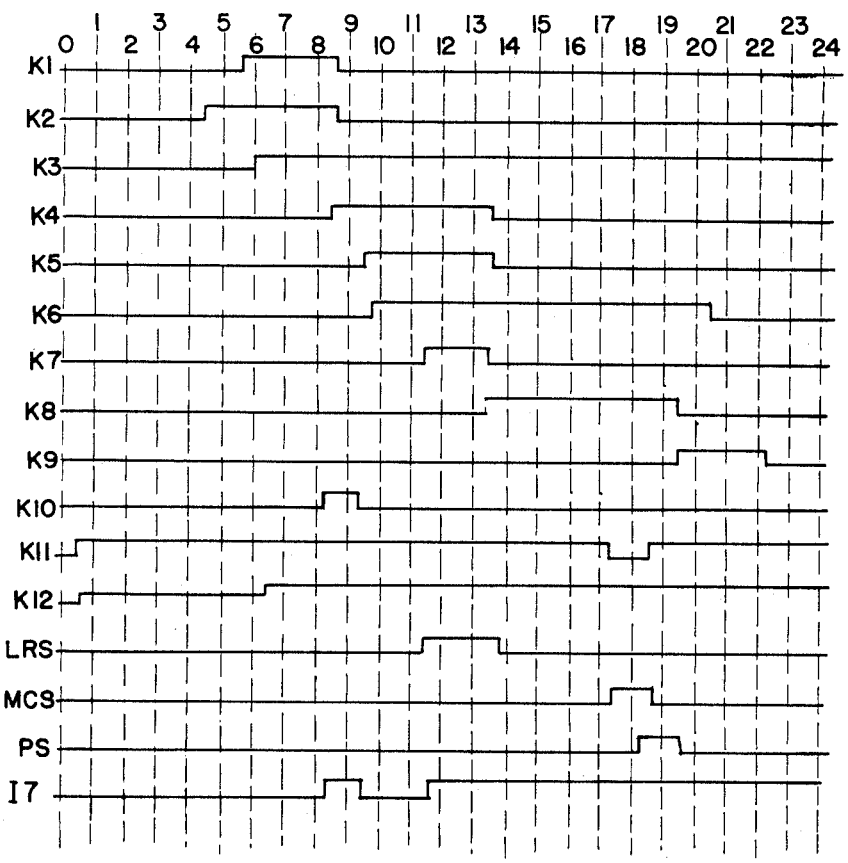
*Fig. VI*

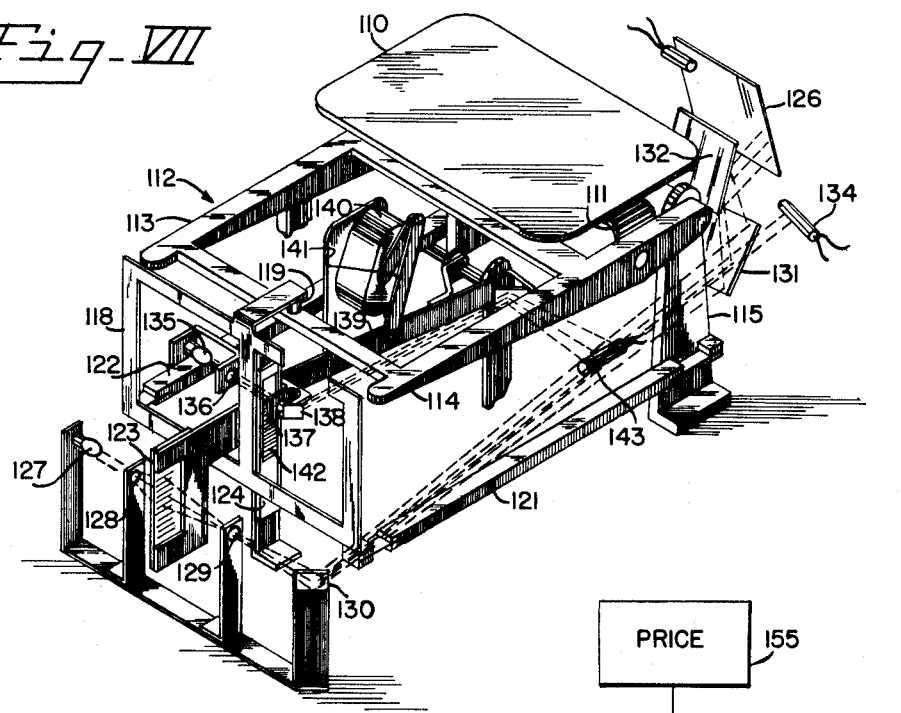

Sept. 14, 1965  R. E. BELL ETAL  3,205,957
WEIGHING SCALE
Original Filed Feb. 28, 1961  7 Sheets-Sheet 7
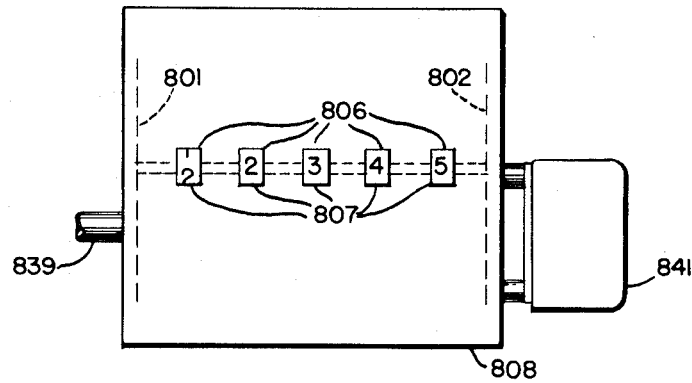
Fig. IX
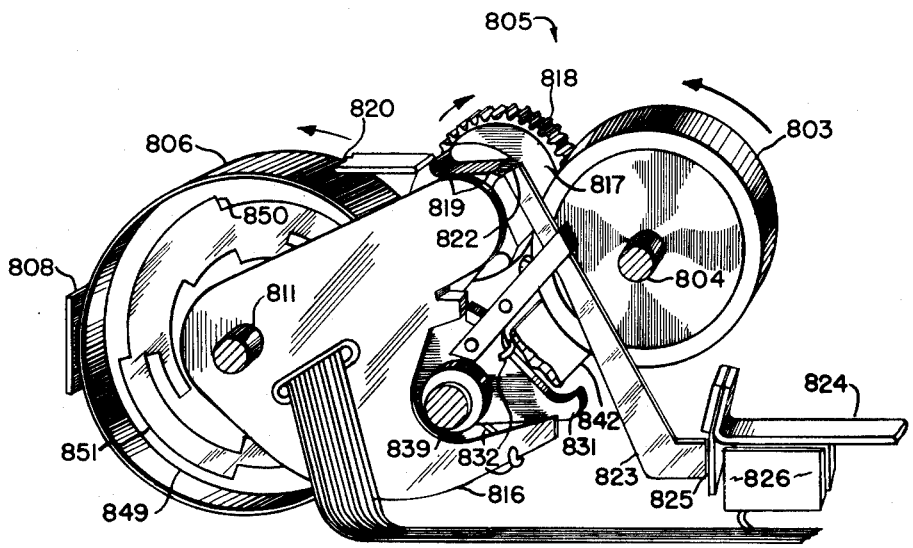
Fig. X
INVENTORS.
ROBERT E. BELL
DONALD B. KENDALL
BY Marshall, Wilson & Yeasting
ATTORNEYS

United States Patent Office 3,205,957
Patented Sept. 14, 1965

3,205,957
WEIGHING SCALE
Robert E. Bell and Donald B. Kendall, Toledo, Ohio, assignors to Toledo Scale Corporation, Toledo, Ohio, a corporation of Ohio
Original application Feb. 28, 1961, Ser. No. 92,233, now Patent No. 3,163,247, dated Dec. 29, 1964. Divided and this application Oct. 17, 1963, Ser. No. 316,908
9 Claims. (Cl. 177—3)

This invention relates to a weighing scale, and more particularly to improvements in a device for weighing an article and exhibiting data incorporating a weight factor, for example a device for use in retail stores to compute the money value of a package of a material according to the weight of that particular package and the price per unit of weight of the material.

A known device of this type includes a platform on which packages are placed for weighing. After a package has been placed upon the platform of this device, data representing the weight of the package are transferred to a computer which has been preset in accordance with the price per unit of weight of the material in the package. The computer multiplies the weight by the price per unit of weight to determine the money value of the package, and the weight and the money value of the package are then printed upon a label.

In the operation of this known device, irregularities may occur which tend to cause errors. One type of irregularity is that which may occur, after an operator has weighed a series of packages of one type of commodity, when the operator begins to weigh a new series of packages containing another type of commodity which is to be sold at a different price per unit of weight. In this situation, the computer in this device would have been preset in accordance with the price per unit of weight of the first type of commodity, so that it is necessary for the operator to reset the computer in accordance with the price per unit of weight of the second type of commodity before he begins to weigh the packages of that commodity. An error may occur if the operator momentarily forgets to reset the computer in accordance with the price per unit of weight of the second type of commodity, for example if he places the first of the new series of packages upon the platform of this device and then attempts to change the price setting of the computer while the computer is computing the value of that package. In order to guard against this type of situation, the known device is so designed that if the price setting of the computer is changed during a computing operation, the device will be shut down and an "error" light will be displayed. When this occurs, the device cannot be operated further until the operator has pressed a "reset" button.

The device of the present invention embodies an improved type of control system which guards against any attempt by the operator to change the price setting during the operation of the computer. The control system in the present device also guards against any attempt by the operator during the operation of the computer to change the type used to print the name of the commodity. If the operator during the operation of the computer in the present device attempts to change either the name type or the price setting, the present device is automatically restored to condition for starting a new operation, so that the operator, perceiving that the device has been restored to its starting condition, will proceed with a normal cycle. This provides a much simpler operation than the known device which displays an error light and requires the operator to press a reset button before he can proceed with a new cycle.

It frequently happens that the commodity to be weighed at the beginning of a working day is different from the commodity that was being weighed at the end of the previous day, and is sold at a different price per pound. When that is the case it is necessary that the operator change the name type so that the correct name of the commodity will be printed upon the labels, and that the operator change the price setting so that the value of the commodity to be weighed will be computed at the correct price per pound. In order to guard against failure of the operator to make a correct price setting and a correct name setting when the present device is placed in operation at the beginning of a new run of weighings, the present device is provided with a novel control which it is actuated by interruption of power for preventing operation of the device upon restoration of power, said control being restored to its non-actuated condition in response to change of the name setting and price setting. This novel control makes it necessary that the operator make a new price setting and a new name setting whenever the power is turned on, before the present device can be operated.

In the operation of the known device, an error will occur when the operator begins a series of weighings with a new type of commodity if the operator changes the price setting but forgets to change the type for printing the name of the commodity. If that occurs the device shown in that patent will proceed to print labels with an incorrect commodity name. The device of the present invention includes a novel control which prevents the present device from being operated to print a new price by changing the price setting unless the name setting is also changed.

The principal object of the invention is to provide a device for weighing an article and exhibiting data incorporating a weight factor which includes an improved control system for eliminating errors that have been found to occur in the operation of known devices of this type.

It is a further object of this invention to provide an electronic computing scale which automatically issues a label, when a package is placed on the scale, the label having printed thereon the price per pound, the net weight of the package, and the total value of the package. The label may also have printed thereon a commodity name and grade classification, code dates, and store identification numbers.

More specific objects and advantages are apparent from the following decription, in which reference is had to the accompanying drawings illustrating a preferred embodiment of the invention.

In the drawings:

FIGS. I and II are schematic block diagrams of a preferred form of device embodying the invention for reading out weight data in digital form and also multiplying the data by a preset price per unit of weight and indicating the data and the product in a form suitable for visual observation or recording;

FIGS. III, IV and V are schematic diagrams of the master control and sequencing circuit of the device;

FIG. VI is a timing diagram illustrating the sequence of events occurring during the operation of the device;

FIG. VII is a perspective schematic view of the indicating mechanism of a weighing scale utilized in this invention;

FIG. VIII is a block diagram showing the cooperation of the various electrical circuits utilized in motion detection interlocking;

FIG. IX is a front elevation showing an assembled numerical display or printing readout device comprising five indicia bearing drum members, four of which are stopped in indicating position; and FIG. X is a perspective view of one of the duplicate assemblies comprising a readout means shown in FIG. IX.

Referring to FIGS. I and II there is illustrated in block schematic form an electronic computer scale embodying the teachings of this invention. The system consists of three primary units. First, there is the scale and scanner unit which includes a weighing mechanism 91, a motion detector 92 and a scanner 94. Secondly, a computer is illustrated including a pulse shaper-blocking oscillator section 97, a multiplier 98, weight counters section 99, and value counters section 104. The last of the three primary units comprises a readout printer which includes the readout circuits, a check circuit 100, and the printer 107.

The weighing mechanism 91 includes a scale chart having two sections, a weight portion in fractions of a pound decimal graduations and a separate column of a plurality of lines used in conjunction with the motion detector. The weight portion of the scale chart is projected for visual indication. A scanner shutter or mask is mounted on a scale chart lever. When a load is applied to the commodity receptacle the shutter moves with the chart lever, exposing one line on the scanner chart for each unit of weight of load applied. The scanner 94 will not begin the scan when a load is applied to the commodity receptacle until the weighing mechanism 91 comes to rest. This prevents erroneous weight readouts and is accomplished by the function of the motion detetcor 92. The motion detector consists of a light source, a chart, a photocell, a motion detector sub-chassis and a relay. The cooperation of these primary components will be described hereinafter with the detailed description.

When the scale mechanism is in motion, the constant light on the detector photocell is interrupted by the lines of the motion detector chart. These interruptions or variations in light on the photocell cause the photocell to produce an electrical pulse for each interruption or variation in light. This output is coupled to the input of the motion detector sub-chassis which, in turn, provides the proper voltage to energize the motion detector relay which is mounted in the control unit 93. As long as the scale mechanism is in motion and the detector photocell is providing an output the detector relay will remain energized and the scanner will not scan. When the scale mechanism comes to rest the detector photocell output drops, the detector relay is deenergized, and the scanner 94 will scan.

The scanner unit 94 converts the travel of the scale lever system to electronic pulses. These pulses are coupled to the computer section to provide weight and value computations. The scanner has four primary components as follows; a light source (which may be the same light source as used for the motion detection), a scanner chart having a plurality of lines where each line represents a decimal fraction of a pound, a scanner photocell and a photo amplifier. If the scale chart were a 25 pound capacity decimal chart and a 2500 line scanner chart was utilized as being equal to the scale chart capacity, then each line on the scale chart would represent .01 of a pound. Therefore, for example, a two pound load on the commodity receptacle would cause a projected weight indication of two pounds and 200 lines of the scanner chart would be exposed by the shutter. The scanner light source scans the 200 exposed lines on the scanner chart projecting a ray of light through the chart onto the scanner photocell for each line on the chart exposed. The photocell converts each light ray into an electrical pulse which is coupled to the input of the photo amplifier 95. Since the output of the photocell is quite small, the pulses are advantageously amplified before being coupled to the computer section. The purpose of the photo amplifier, therefore, is to provide the necessary amplification of the electrical pulses produced by the photocell.

The scanner has two other functions. A first function is to create a reset pulse which resets the computer to zero. Secondly, a gate pulse is created to tell the computer when it is going to start to scan and when it has completed the scan.

The amplified pulses from the photo amplifier 95 of the scanner are coupled via a lead to the blocking oscillator in the shaper sub-chassis. The purpose of the blocking oscillator is to convert or shape each pulse received into a pulse of short duration with a fast rise time. These shaped output pulses from the blocking oscillator are identical in amplitude, rise time and pulse duration. The output pulses are then coupled to the input of the multiplier 98.

The multiplier 98 comprises ten individual blocking oscillator circuits similar to the one in the shaper. The purpose of the oscillators is to generate ten output pulses for each input pulse received from the shaper. The first nine pulses are used for computing the value of the commodity and the tenth pulse is presented to the weight counters to provide commodity weight data. When a pulse from the shaper is coupled to the multiplier input, the first blocking oscillator fires, creating an output pulse similar to the first pulse. This pulse is then coupled to the second stage, causing it to fire. This output is then coupled to the third stage and so on until all ten blocking oscillators have fired. This is one method of producing ten output pulses for each input pulse.

The two gated amplifiers of the shaper section 97 have identical outputs. One output is coupled to the weight counters 99 for total weight data and the other to the computer check flip flop 100 located in the readout section. This output is used as part of the check circuitry designated generally at 108.

The four weight counters the outputs of which may be, for example, denoting 10 pounds, 1 pound, .1 pound and .01 pound, are reset to zero just before the light source scans the scanner weight chart. For each weight line scanned one pulse will be presented to the input of the .01 decade counter. When ten pulses have been coupled to this counter input, the counter creates a carry pulse which is then coupled to the next counter. This accomplishes the "carry 1" as in the normal process of addition. The .1 pound counter receives one pulse for every ten pulses fed into the .01 pound counter. Eventually, after receiving ten pulses or counts from the .01 counter, the 0.1 counter also creates a carry pulse which is coupled to the 1 pound counter. The output of each decade counter is taken from the counter on eight wires. Each output is coupled to its corresponding indicating wheel in the readout section.

The function of the diode matrix 102 is to organize the output of the multiplier blocking oscillators so that the proper number of pulses will be present at each contact point of the price selector switch boards 103 for each weight pulse. For example, if a one pound load is placed on the commodity receptacle, the scanner will scan one hundred exposed lines on the scanner chart. The scanner photocell output will be one hundred pulses. These one hundred pulses are fed through the photo-amplifier 95 and the gated blocking oscillator to the input of the multiplier blocking oscillators. Each input pulse is developed into ten output pulses. One of each group of ten output pulses is fed to the weight counters 99 (each pulse here represents .01 pound) thus providing necessary data for weight determination. The other nine pulses are fed to the diode matrix input. Therefore, for every weight pulse, which represents .01 pound in this embodiment, nine subsequent pulses are fed to the input of the diode matrix. In the present example the total input to the diode matrix will be one hundred groups of pulses with nine pulses in each group.

For each .01 pound counted, the diode matrix output presents a number of pulses to each contact point of the three price selector switch boards equal to the value of the board contact point position. For example, the zero contact point on each board does not receive any pulses. The No. one contact on each board receives one pulse each, the No. two contact on each board receives two pulses each, etc. Each contact point on each board is presented its corresponding number of electrical pulses for each cycle regardless of the price per pound switch arm positions. The portion of the output of the diode matrix which becomes the input to the value counters, however, is determined by the positions of the price per pound selector switch arms. For example, assume the price per pound setting is $1.25. The contact brush on the penny arm of the price selector will be at the No. five contact of the penny board. This allows five pulses from the diode matrix to pass through the penny board to its respective gated amplifier in the carry storage sub-chassis. The five pulses are amplified and presented to the value counters 104 as penny data. The contact brush on the dime arm of the price selector will be at the No. two contact of the dime board. This allows two pulses from the diode matrix to pass through the dime board to its respective gated amplifier in the carry storage sub-chassis. The two pulses are amplified and presented to the value counters as dime data. The contact brush on the dollar arm of the price selector will be at the No. one contact of the dollar board. This allows one pulse from the diode matrix to pass through the dollar board to its respective gated amplifier in the carry storage subchassis. The one pulse is amplified and presented to the value counters as dollar data. From the above it can be seen that a value is established for each .01 pound of load on a commodity receptacle to determine the total commodity value. The value established is, of course, determined by the price per pound switch set up.

There are three gated amplifiers in the carry storage sub-chassis which amplify the input to the value counters 104, one amplifier for each of the three commutator boards of the price selector switch and their respective value counters. The amplifiers are required to insure that the voltage of the input pulses to the value counters is sufficient to fire the counter tubes. The following explanation shows how value data is presented and accumulated in the value counters for each weighing operation using a load of one pound and a price per pound of $1.25 as an example.

For each weight pulse or .01 pound of load on the commodity receptacle the input to the value counters is: (1) five pulses through the penny commutator of the price per pound switch are amplified and fed to the .0001 value counter. (2) two pulses through the dime commutator of the price per pound switch are amplified and fed to the .001 value counter. (3) one pulse through the dollar commutator of the price per pound switch is amplified and fed to the .01 value counter. From the above three steps and the example of $1.25 per pound, it can be seen that each weight pulse or .01 pound is equal in value to $.0125. The load example is one pound, therefore there will be one hundred weight pulses. In this case the total input to the value counters will be one hundred groups of pulses with each group having a value of $.0125. This then provides a total value of the commodity weighed in the example of $1.25. In the example above, the first weight pulse (.01 pound) will cause the first group of value pulses to record $.0125 in the value counters. The second group of pulses will add another $.0125 to the value counters changing the counters to $.0250. The third group of pulses will add another $.0125 to the value counters changing the value counters to $.0375, etc.

It is possible under the arrangement above for the normal carry pulse (that pulse carried from one counter to the next when the tenth pulse has been coupled to a counter causing the counter to reset to zero and carry one pulse) to occur at the same instant value pulses are being fed into the counters. To prevent such an occurrence, which could result in erroneous values, carry pulses are not fed to the next counter until all value pulses created by one weight pulse are fed into the counters. This is accomplished by a memory or carry storage flip flop circuit. After all value pulses, created by one weight pulse, are fed into the counters the carry pulse is fed from the carry storage sub-chassis into the next counter. The block diagram shows that only the carry pulses from the .0001 and the .001 decade counters are fed to the carry storage flip flop. Carry pulses from the .01, .1 and 1 counters are coupled directly into the next stage counter as there is no direct input to the .1, 1 and 10 counters which would cause the carry pulse to be in conflict.

The readout uses the output of the weight and value decade counters to properly position a visual indicating wheel, and to set up a corresponding print wheel, indicating the weight and total value of the commodity weighed. The readout also has a check circuit which ascertains that both the print wheels and visual readout wheels are properly positioned before signaling the printer 107 to operate.

The weight and value sections of the readout operate in a like manner, therefore, for purposes of explanation the output of the .01 (penny) value decade counter in its respective indicating wheel, the penny readout wheel, will be explained. Assume the total value of the commodity weighed is $1.25. The digit "5" must be set up on the penny indicating wheel, from the output of the .01 value counter. Each decade counter is a standard counter having four dual triode tubes and each tube contains a left and right anode. When the .01 value counter has been pulsed to the digit "5," the No. 1 anode in the A and C tubes and the No. 2 anode in the B and D tubes are more positive, indicating that these anodes are providing a higher voltage output than the other anodes in each tube. There is a prong on each readout wheel commutator brush for each anode in the decade counter tubes. There are eight brush prongs corresponding to the number of tube anodes plus one common prong. Each anode and its respective brush prong are wired together. The common prong of each brush is wired to the readout wheel trigger amplifier.

The readout wheel will lock in the "5" position, in this case, because the following tube anodes are providing higher voltage output than the other anodes, that is, A1, B2, C1 and D2. The commutator brush prongs having the above-mentioned anode descriptions are the prongs which are receiving a sufficient combined voltage output to fire the tube in the trigger amplifier. When the tube is fired the trigger relay is energized and the relay finger initially locks the wheel. In this case, the wheel will only lock in the "5" position as only in that position will the A1, B2, C1 and D2 prongs on the commutator brush be connected by the common prong to the trigger tube.

All eight trigger amplifiers send their check signal to the check circuit amplifier along with a signal from the computer check flip flop. The check circuit amplifier portion of the readout has two primary functions: first, to make certain that all commutator wheels are properly positioned, and secondly, to make certain that a signal from the computer check flip flop is received indicating that a weight has been placed on the scale platter. When the scanner has completely scanned the chart, a signal is sent to the control unit, which, in turn, creates a signal energizing the latch release solenoid. The latch release solenoid in turn unlocks the indicating wheels from their previous setting and lets them rotate. Each commutator wheel selects the number which corresponds to its respective decade counter. The trigger amplifier energizes the trigger relay, locking the wheel in proper position. Providing a check pulse from the gated amplifier in the shaper has been presented to the computer check flip flop in turn coupling a signal to the check circuit amplifier 18, and if all the trigger amplifiers are checking on the proper number, the check circuit amplifier pulls the mechanical check solenoid. The check solenoid releases the mechanical checking device which ascertains that all indicating wheels are properly positioned mechanically. If positioned properly a set of contacts are closed and the print solenoid is energized, allowing the printer to cycle.

The indicating wheels mentioned above are coupled via a group of idler wheels to the print wheels. Therefore, when the indicating wheels have been locked in their proper position, the print wheels are also locked in the same position. After the print solenoid is pulled, the carriage travels from left to right, inking the print wheels. A label is then positioned and as the carriage returns the label is printed and cut off. When the carriage reaches the "home" position the label is delivered to the activator unit. This label must be removed from the activator unit before the next label can be printed.

United States Patent No. 3,105,940 discloses a weighing mechanism and a motion detector suitable for use in the system shown in FIGS. I and II.

FIG. VII shows a suitable weghing mechanism and motion detector. A load receiver or commodity receptacle 110 is carried on a spider 111 that is pivotally mounted on a lever 112 having spaced apart arms 113 and 114. The lever 112 is carried on fulcrum stands 115 of which only one is visible in the figure. A check link, not shown, is employed to keep the load receiver 110 in a level condition at all times. Such check links are well known in the weighing scale art. Load counterbalancing springs, not shown, that are connected between the lever arms 113 and 114 and a rigid support are arranged so that the vertical movement of the free ends of the lever arms 113 and 114 is proportional to the weight of the load placed on the load receiver 110, a lightweight frame 118, supported on a cone pivot 119 mounted in the center of a cross bar 120 connecting the ends of the lever arms 113 and 114 and guided by check links 121 and 122, serves as a support for a movable projection chart 123 and for a mask 124. The frame 118 is provided with the three point support, i.e. the pivot 119 and the check links 121 and 122, so that it is not subjected to any bending or twisting strains that would tend to distort it and so that it follows the average motion of the lever arms 113 and 114 regardless of the distribution of load on the load receiver 110.

Visual indications of the load on the scale are provided by an optical projection system that projects enlarged images of the graduations of the projection chart 123 onto a screen 126. The optical projection system includes a light source 127, a condensing lens 128, a projection lens 129, mirrors 130, 131 and 132 and the screen 126. In addition to providing the visual projected indication on the screen 126 the optical projection system also projects images of the left hand portion of the chart lines as seen in FIG. VII onto a photocell 134 that cooperates with electronic equipment to provide a signal indicating relative motion between the indicating mechanism of the scale and the frame of the scale.

The indicating system also includes scanning means for delivering or providing a series of electrical impulses corresponding in number to the weight of the load on the scale. This indicating means includes a second light source 135 and condensing lens 136 which together with a projection lens 137 and mirror 138 are mounted on an oscillating arm 139 that is driven by a motor 140 by means of a crank and connecting rod 141. This moving optical system scans a stationary chart 142 that is variably masked by the mask 124 and projects images of the exposed graduations onto a stationary photocell 143. Electronic amplifying and counting means, described hereinafter, connected to the photocell 143 gives an indication of the weight of the load in accordance with the number of images of the exposed graduations that are swept across the photocell by the movement of the moving optical system. The photocells 134 and 143 are each provided with masks or slots approximately equal in width to the width of a projected graduation line so as to get the maximum signal output from the photocell for each graduation that is swept across the cell.

In the complete indicating system electronic means are employed to respond to the signals generated in the photocells 134 and 143 to provide an indication of weight only after the weighing mechanism has come to rest and an accurate reading may be taken. This equipment, as indicated in block form in FIG. VIII, may include a scanner 150 which includes the optical system comprising the light source 135 and the projection lens 137 up to and including the photoelectric cell 143 and any preamplifier used therewith. Electrical pulses from the scanner 150 are passed through an amplifier 151 and gate 152 into an electronic multiplier 153. The electronic multiplier 153 is arranged to feed a plurality of pulses into an amount counter 154 in accordance with a price set up in a price setting mechanism 155. The multiplier 153 also delivers one output pulse for each pulse received to a weight counter 156. The signals to the weight counter 156 may just as well be taken from the output of the gate 152 without passing through the multiplier 153 except that the arrangement shown insures that no indication will be produced in the weight counter 156 unless the multiplier 153 is in operating condition.

To guard against the possibility of a fractional or incomplete scan being read as a complete scan a scan detector 157 serving as a first gate is connected to the output of the amplifier 151 and includes electronic circuits responsive to the envelope of the series of pulses produced by the scanner 150 and arranged to deliver a signal to a reset amplifier 158 to reset the counters 154 and 156 at the start of each scan. This reset occurs on the first pulse of a scan which preferably is produced by a single graduation or line spaced about five units ahead of the regular series of graduations of the chart 142. The scan detector 157 also operates the gate 152.

When a system is to be operated automatically it is also necessary to prevent signals from the scanner from reaching the multiplier and, through it, the amount and weight counters unless the scale is at rest in order that the indications be indicative of the actual load on the scale. This is accomplished by means of the photocell 134 included in the photo-pickup circuit 159 which in cooperation with an amplitude and frequency filter 160 controls the scan detector 157 to prevent it from opening the gate 152 unless the weighing scale is substantially at rest and a scan is ready to start.

The circuits comprising the photo-pickup 159 and the amplifier and frequency filter 160 are a form of motion detector. For satisfactory operation of such a motion detector in high speed operating equipment it is necessary that the detector respond very quickly to relative motion exceeding a certain amount and also deliver an all clear or quiescent condition signal immediately upon the system reaching a quiescent state.

United States Patent No. 2,938,126 also discloses a basic mechanical embodiment of the scanner used in the preferred form of the present invention.

Since the pulses that are generated by the photo amplifier 95 may not be of suitable wave shape for operation of the pulse generator or multiplier 98, the amplifier and shaping circuits 97 are included between them. A suitable amplifier and pulse shaping circuit and a pulse generator are illustrated in United States Patent No. 3,055,585.

United States Patent No. 2,759,672 shows a particular embodiment of the readout device illustrated in FIG. II.

Referring now to FIGS. IX and X, there are shown particular embodiments of a binary to decimal converter and a readout device. This electro-mechanical combination may be constructed on a frame having vertically upstanding end plates 801 and 802. A complete device comprises a plurality of duplicate subassemblies, one for each place in the readout indicia or number to be indicated. The subassemblies, one of which is shown in FIG. X are driven mechanically by a series of spaced apart power wheels 803 mounted on a power shaft 804 journaled on bearings adjustably mounted, (not shown) in the end plates 801 and 802. The power wheels 803 are continuously rotated when the device is in operation and, when engaged, frictioanlly drive a plurality of intermediate drive wheels or idlers 805 each of which positively engages and rotates one of a plurality of generally cup-shaped hollow drum members 806 bearing indicia on their cylindrical surfaces. If a visual readout is desired the indicia may be in the form of numbers, for example, which would then be visible through the windows 807 in a front wall 808 of a housing enclosing the devices. For the purposes of printing, the indicia on the drum 806 may be of the raised type which when wiped with an ink roller and pressed on a readout card or label prints the indicia registered on the readout device. The readout device may be adapted to produce both the visual and printing readout operations by the connection of the readout drums through, for example, gearing means.

The drum member 806 is mounted for rotation on a needle bearing located axially, by means of a snap ring, (neither shown) on an axle 811 extending between the end plates 801 and 802. A flanged bearing held by a second snap ring (neither shown) on the axle 811 holds the needle bearing in place against the inner surface of the first snap ring. The idler 805 is fitted with bushings turning on an axle (neither shown) fixed to an arm of a support member 816 fixedly mounted on the flanged bearing. Thus, the rockable support member 816 and the drum member 806 have a common pivotal axis defined by the axle 811.

The idler 805 includes, to cooperate with the power wheel 803, a friction drive surface 817, which may be knurled, flanked by a gear 818 on one side and five equally space apart teeth 819 on the other side. When the readout device is in operation so that the power wheels 803 are constantly rotated and when the support member 816 is rocked to engage the drive surface 817 of the idler 805 with its power wheel 803, the power wheel 803 continuously rotates its associated idler 805. The rotating idler 805 drives the drum member 806 at half its speed, the gear 818 on the idler 805 being engaged with a gear 820 mounted on the side of the cup-shaped hollow drum member 806. A second gear on the side of the drum member 806 could be used to drive a train of gears to set type wheels according to the indicia displayed through the windows 807. The directions of rotation of the power wheels 803, of the idlers 805, and of the drum members 806 are indicated by arrows in FIG. X.

When the turning drum 806 approaches the position at which it is to stop, a signal is transmitted through a binary to decimal converter circuit controlling the indication of the count, to cause an end 822 of a solenoid operated latch 823, one of which is provided for each idler 805, to intercept the approaching of the five teeth 819 on the side of the idler 805 at a position adjacent the associated power wheel 803 thereby stopping that one of the drum members 806 at one of ten possible stopping positions. The latch 823 is fulcrumed on a bracket 824 by means of a flexure plate return spring 825, the bracket 824 extending between the end plates 801 and 802. The latch 823 is actuated by a solenoid 826 fixed to the bracket 824, the solenoid 826 being energized to actuate the latch by the signal through the circuit controlling the indication of a count. Ten possible stopping positions are provided because of the readout device is to indicate in the decimal system of notation. Should some other system of notation be employed a different number of teeth 819 or a different ratio between the idlers and the drums or both would be used. The present device provides the ten stopping positions for the drum members 806 with five teeth 819 on each of the idlers 805 and a two to one ratio between the drum members and the idlers.

When the display device is in operation and when the power wheels 803 are engaged by the idlers 805, the drive for the drum members 806 bearing indicia on their cylindrical surfaces is positioned as shown in FIG. X with the power wheels 803 continuously rotating and driving the idlers 805 and the drum members 806.

The drum members 806, once started, are continually in motion until they are stopped in positions corresponding to a count in the controlling electronic counter. The drum members 806 are stopped in such positions in response to a signal from the counter by the action of solenoid operated latches 823 engaging the idlers 805 and stopping the drum members 806 engaged with the idlers at one of ten possible stopping positions.

The inertia of the stopping driven members rocks their associated support members 816 counterclockwise, as viewed in FIG. X out of engagement with the sectors 831 which are then instantly urged against the idlers 805 under the action of the springs 832. In such position, each sector 831 locks it latch 823 to accurately hold its drum member 806 to align one of the ten indicia on the periphery of the drum in viewing position.

When a new reading is to be made, the rotary solenoid 841 is caused to be energized momentarily rocking the shaft 839 and the bar 842 attached thereto. The bar 842 first rocks the sectors 831 clockwise unlocking the stopped drum members 806 and then rocks the support members 816 in the same direction about the axis of the shaft 811 to bring the idlers 805 into frictional engagement with the power wheels 803, whereby all of the rotatable drum members 806 are simultaneously, quickly and positively started and continue in motion until they are each again stopped and locked in indicating positions corresponding to a count in the corresponding section of the controlling electronic counter.

For a more detailed description of the construction and operation of such a binary to decimal converter and a readout device reference is made to United States Patent No. 2,759,672, issued August 21, 1956, and entitled "Mechanical Drive Numerical Display Devices." Reference is also made to another embodiment suitable for use herein which is described in copending application Serial No. 15,499, filed March 16, 1960, and assigned to the same assignee as this invention.

FIGS. III, IV and V show a preferred master control and sequencing circuit for the device disclosed herein.

The relays and all other components illustrated are shown in across-the-line diagrams. Their contacts therefore are often located remote from the actuating coils. In order to illustrate the relationship and location of actuating coils and contacts, the marginal key has been employed with each circuit diagram whereby the circuits are divided into horizontal bands which are identified by line numbers in the right hand margin of the figure. Relay symbols are located in that margin to the right of the key numbers in horizontal alignment with the relay actuating coil positions. Each contact actuated by a relay coil is designated to the right of the relay symbol by the numeral of its line location. Back contacts, those which are normally closed when the relay armature is dropped out and are opened when the actuating coil is energized, are underlined in the key to distinguish them from front contacts, those which are closed upon the coil being energized. Thus for example, price and name relay K3 has its actuating coil located at line 54 of FIG. IV and when energized closes its front contacts at lines 26, 49 and 55 of FIGS. III and IV, respectively designated in the margin at 26, 49, 55 and opens its back contacts at line 35 of FIG. III designated in the margin by 35. Each contact is also labeled with the symbol of its actuating means and is illustrated in the condition it assumes while its armature is dropped out so that the front contacts of the price and name relay K3 are shown open, as in line 26, and are labeled K3 while the similarly labeled back contact K3 at line 35 is shown closed.

To assist in locating the various relays and other components in the master control circuit the following list is provided setting forth the symbol of the component, name of the component and line location.

*Component list*

| Symbol | Name | Line Location |
|---|---|---|
| B2 | Main Drive Motor | 18 |
| B3 | Readout Fan Motor | 17 |
| B4 | Computer Fan Motor | 19 |
| HR1 | Activator Heat Element | 12 |
| I1 | Scanner Lamp | 23 |
| I2 | Scale Projection Lamp | 22 |
| I3 | Tare Lamp | 34 |
| I4 | Set Price and Name Lamp | 35 |
| I5 | Add Label Lamp | 33 |
| I6 | Take Label Lamp | 36 |
| I7 | Ready Lamp | 26 |
| I8 | Press Reset Lamp | 27 |
| K1 | Change Price Relay | 50 |
| K2 | Change Commodity Relay | 52 |
| K3 | Price and Name Relay | 54 |
| K4 | Start Cycle Relay | 58 |
| K5 | Scanner Control Relay | 61 |
| K6 | Scanner Start Relay | 62 |
| K7 | Wheel Release Relay | 64 |
| K8 | Cycle Complete Relay | 70 |
| K9 | Take Label Relay | 72 |
| K10 | Motion Detector Relay | |
| K11 | Check Circuit Relay | |
| K12 | Time Delay Relay | 31 |
| LRS | Latch Release Solenoid | 44 |
| MCS | Mechanical Check Solenoid | 41 |
| PS | Print Solenoid | 49 |
| SM1 | Scanner Motor | 13 |
| SR1 | Motor Starting Relay | 18 |
| SW1 | Sensing Bar Switches (Home) | 27, 49, 61 |
| SW2 | Sensing Bar Switches (Out) | 70 |
| SW3 | Sensing Bar Switches (Middle) | |
| SW4 | Repeat Print Switch | 47 |
| SW5 | Carriage Home Switch | 44 |
| SW6 | Carriage Home Switch | 70 |
| SW7 | Paper Supply Switch | 33 |
| SW8 | Commodity Plate Switch | 54 |
| SW9 | Price Change Switch | 54 |
| SW10 | Take Label Switch | 72 |
| SW11 | Take Label Switch | 49 |
| SW12 | Activator Thermostat Switch | 12 |
| SW14 | Paper Supply Switch | 49 |
| SW15 | Housing Door Interlock Switch | 18 |
| SW16 | Tare Switch | 34 |
| SW17 | Overload Switch | 57 |
| SW18 | Zero Switch | 57 |
| SW19 | Scanner (Home) Switch | 62 |
| SW20 | Scanner (Out) Switch | 64 |
| SW21 | Scanner Gate Switch | 73 |
| SW22 | Scanner Off-On Switch | 13 |
| SW23 | Activator Off-On Switch | 12 |
| SW24 | Reset Off-On Switch | 59 |
| SW25 | Printer Mode Switch | 45, 48, 56, 59 |
| SW26 | Thermostat Switch | |
| SW27 | Main Power Switch | 11 |
| SW29 | Repeat Wheel Set Up Switch | 46 |
| TA1 | Tare Switch | 50 |
| TA2 | Tare Switch | 54 |
| T11 | Regulating Plate Transformer | 20 |
| T12 | Filament Transformer | 28 |
| T13 | Plate Transformer | 24 |

Referring to FIG. III there is shown in line 10 plug means P1 for attaching the control circuit of this invention to electrical power. Switch means SW27–A and SW27–B in line 11 are ganged together and are operative to be closed to supply power from the plug means P1 to the control system. When power is supplied to the leads L1 and L2 the system is protected by fuses F2 and F1 in lines 12 and 13. The scanner motor field SM1 in line 13 is supplied with power through the scanner motor switch SW22 and the housing door interlock switch SW15 in line 18. A fan B3, for cooling the readout means, in line 17 is energized. A fan B4, for cooling the computer means, in line 19 is energized. The main drive B2 in line 18 is energized through its starting relay SR1 and runs continuously except when the switch SW15 is opened by the opening of a door to the housing. The switch SW15, then acts as an interlock since the housing door may provide access to the printer, the ticket chute, ink roll, or the scanning mechanism so that when the printer mechanism or the scanning mechanism is being worked on the operation of the main drive motor may be suspended by the opening of the switch SW15. The primary of a regulating plate transformer T11 in line 20 receives power, thus supplying power to the secondary winding of the regulating plate transformer T11 so that the scale projection lamp I2 and the scanner lamp I1 in lines 22 and 23 are illuminated.

Power is also applied to the filament transformer T12 in line 28. The filaments of the various tubes are represented schematically by the block diagram in line 32 and are connected to a first secondary winding of the filament transformer T12. A time delay relay K12 is also connected to the first secondary winding of the filament transformer T12 at line 31. After a predetermined interval the time delay relay K12 closes its contacts in line 24 thus supplying power to a plate transformer T13 in line 24. Circuits are thus enabled to illuminate a "ready" lamp I7 in line 26 through scanner control relay back contacts K5 and motion detector relay back contacts K10 in the same line whenever price and name relay front contact K3 closes after the price has been set and a commodity plate has been inserted into the electronic computing scale. A "press reset" lamp I8 in line 27 will then be illuminated if the switching means SW1–C is closed and the back contacts of the scanner start relay K6 are closed.

When the filament transformer T12 is energized power is then supplied to an "add labels" lamp I5 in line 33. The "add labels" lamp I5 will illuminate when switching means SW7 is closed. The switching means SW7 is responsive to the presence or absence of paper (or labels) in the ticket dispensing chute of the system. Power is also applied to the tare lamp I3 in line 34. The tare lamp I3 will light whenever the switch SW16 is closed. The switch SW16 is responsive to a tare setting knob and may be set to close only when a tare has been set into the electronic computing scale. A "Set Price and Name" lamp I4 in line 35 also receives its power from the first secondary winding of the filament transformer T12 and is illuminated in response to the closing of the price and name relay back contacts K3 in line 35. The relay K3 is responsive to an initial setting of the price and the insertion of a commodity plate and thus the back contacts K3 are closed whenever a price has not been set or a commodity plate has not been inserted as will be described hereinafter. A "take label" lamp I6 in line 36 is illuminated from the filament transformer if the take label relay front contacts K9 in line 36 are closed. The relay K9 is responsive to the end of a printing cycle and will be energized and thus close contacts K9 when a printing cycle is complete indicating that a label is in a dispensing position and should be taken. A second secondary winding of the transformer T12 supplies power to leads L3 and L4 through fuses F3, F4 and rectifiers 1CR, 2CR, respectively, for the next portion of the control and sequencing circuit.

Referring to FIG. IV there is shown in lines 50–54 an interlocking means which either prevents the actual computation of a total value or prevents operation of the printer or readout device, which is to supply the printed record, if either the unit price setting or the commodity identifying means setting, or both, have been changed and the tare setting means has not also been changed.

A tare setting knob (not shown) is mounted in a panel of the housing of the electronic computing scale described herein on a shaft having mounted thereon a first cam means and a second cam means. The first and second cam means rotate when the tare knob is rotated. The first cam means is operative through a cam follower to open contacts TA2 in line 50 when the tare knob is set at zero. The second cam means is operative through a cam follower to close contacts TA1 in line 54 whenever the tare knob is set at zero. Cam means may also be utilized to operate tare switching means SW16 in line 34.

A price setting means which may include a price setting knob operating a cam means is utilized to operate the switch SW9 in line 54. The price setting means (not shown) is operative through a cam follower and the contacts of the switching means SW9 to close a circuit between the lead L3 and the lower of the two terminals illustrated in cooperation with the switch SW9 when the price setting knob is set at one of a plurality of positions of price indicia. When the price setting knob is changed to another of the indicating indicia the cam follower of the price setting knob is operative to move the switching means SW9 to cause a circuit to be made between the lead L3 and the upper one of the two contacts associated with SW9. Also shown in line 54 are commodity setting contacts or switching means SW8. The commodity identifying switching means SW8 are normally in an open position, that is, contact being made between the pivot of the switching means SW8 and the upper contact of the switching means SW8. When a commodity plate or identifying means is inserted into a proper receiving means the forward portion of the commodity plate is operative to force the switching means SW8 into contact with the lower of the two terminals. That is, the switching means SW8 is normally in the position as shown in the drawings whenever the commodity plate or commodity identifying means is not inserted. If a wheel or drum with commodity indicia embossed on the rim is utilized then a cam means similar to that discussed above in connection with the price setting means and the tare setting means may be utilized to make the circuit changes as just described whenever the commodity identifying setting has been changed.

The interlock apparatus shown in lines 50–54 operates in the following manner. Assume that a previous series of packaged commodities has just been weighed. The weighing of a new series of packaged commodities is about to begin. The apparatus already has a tare setting from the previous commodity that was a predetermined amount.

The price knob may be turned to indicate the new price for the series of commodities being weighed. Thus, the power to the price and name relay K3 is removed and its sealing contacts K3 in line 55 drop out leaving the price and name relay K3 in line 54 deenergized.

Alternatively, the commodity plate may have been removed and a new one inserted, in which case the switching means SW8 has moved from its lower associated terminal to its upper associated terminal and back to its lower associated terminal, whenever another commodity identifying means is inserted. Therefore, the changing of a commodity plate will also break the seal-in circuit to the price and name relay K3 in line 54 causing it to drop out its seal-in contacts K3 in line 55.

Assume that a new unit price has been set so the contacts of SW9 in line 54 are again in the closed position as shown in the drawings, and that a new commodity identifying means has been inserted so that the switching means SW8 has moved to its bottom position. During the interval when the commodity identifying means was removed a circuit had been completed through the switching means SW9 in line 54, switching means SW8 in line 54, and through the change commodity relay K2 in line 52. The change commodity contacts K2 in line 52 close sealing in the relay K2 through the start cycle relay contacts K4 in line 51. Contacts K2 also close in line 54.

When the unit price setting was being changed the contacts of the switching means SW9 had established a momentary circuit through the normally closed tare contacts TA2 in line 50 and through change price relay K1 also in line 50. Contacts K1 closed in line 51 to seal in the change price relay K1 through the start cycle relay contacts K4 in line 51. Contacts K1 also close in line 54.

Before the computer of the scale may be operative to complete a cycle a tare knob as above described must be turned to zero. By turning the tare knob to zero its cam means is operative to open the switching means TA2 in line 50 while a second cam means is operative to momentarily close contacts TA1 in line 54. Thus, an energizing circuit has been completed for the price and name relay K3 through the switching means TA1, change commodity contacts K2, change price contacts K1, commodity change cam operated switching means SW8 and price setting change cam operated switching means SW9, all in line 54. Energization of the price and name relay K3 causes front contacts K3 in line 55 to close establishing a seal in circuit around the contacts K1, K2, and the switching means TA1. Contacts K3 are also closed throughout the rest of the system to allow operation as hereinafter described.

Thus, it may be seen that the price and name relay K3 in line 54 must be energized to continue the cycle when the price or commodity setting has been changed. Start cycle relay K4 in line 58 is energized at the start of each cycle and not dropped out until a readout has been obtained. Therefore, the seal in circuit through the back contacts K4 in line 51 operates as a memory. That is, one can change either the price setting or the commodity plate means before a scan operation is accomplished. Both the price setting means and the commodity plate means have to be operated at least once first, however, otherwise the sealing circuit provided by the price and name relay contacts K3 in line 55 would be redundant and to no avail.

It should be recognized that the interlocking means just shown can be operated as only a price setting and commodity plate means interlock having the tare interlocking switches TA1 and TA2 in lines 54 and 50 removed.

If the operation of setting the price and inserting the commodity plate has been accomplished then the price and name relay K3 in line 54 is energized and its front contacts in line 26 are closed causing the "ready" lamp 17 to be illuminated, indicating that the electronic computing scale is ready to receive a package to be weighed. A motion detector relay K10 is operated by the output of the motion detecting apparatus described hereinbefore. If there is motion of the scale of the relay K10 is operated and front contacts K10 in line 57 are closed. Thus an energizing circuit for the start cycle relay K4 in line 58 is completed through the closed motion detector relay contacts K10, closed cycle complete relay back contacts K8, overload switching means SW17 and zero switching means SW18, and on through the now closed seal-in contacts K3 in line 55. This is operative to open the start cycle back contacts K4 in line 51 in the commodity and price setting interlock circuit. However, there is no effect upon the price setting and commodity interlock circuit if there is no change in the price setting or commodity plate. Start cycle contacts K4 in line 58 close to seal in the energization of the relay K4 around the motion detector contacts K10 in line 57. Contacts K4 in line 61 close enabling scanner control relay K5 circuit through motion detector relay back contacts K10, wheel release relay back contacts K7, cycle complete relay back contacts K8 and scanner home switch SW19 in line 62. The sensing bar home switching means SW1-A are closed when the previous cycle has checked out successfully. The switching means SW19 is in the position shown when the scanner is in the home position. A scanner may be utilized herein which has a one cycle oscillation and a home position from which it starts. Cam means at that home position operate the switching means SW19. Relay contacts K4 also close in line 64 to ready the circuit for the energization of relay K7.

The energization of the scanner control relay K5, which occurs after the motion-no-motion cycle described above, causes the closure of a first set of K5 contacts and the opening of a second set of K5 contacts, both in line 16, and controls the scanner motor in cooperation with the operation of scanner start relay contacts K6, and back contacts K5 in line 26 control the "ready" lamp 17. Contacts K5 in line 61 provide a seal-in circuit for the relay K5 around the switching means SW19 in line 62. Contacts K5 in line 63 close to energize the scanner start relay K6. Contacts K5 in line 73 close to enable a circuit which allows the count of pulses only when the scanner is moving in a predetermined direction.

The energization of scanner start relay K6 closes contacts K6 in line 15 to supply energization to the shaded pole scanner motor to start a scan. After the scanner motor has moved approximately 10 to 15 degrees from its home position the cam operated switch SW19 is allowed to close to insure that the energization of the scanner start relay K6 is maintained until the scanner completes its cycle and returns to the home position. Back contacts K6 in line 27 open to extinguish or to disable the circuit for the illumination of the "press reset" lamp.

Wheel release relay K7 is operated by the closure of the scanner out switch SW20 in line 64. The switch SW20 closes when the scanner is in its out position. The wheel release relay K7 is energized through the K4 contacts which have already been closed and the back contacts of the relay K10 which are closed since no motion is now being detected. Contacts K7 close in line 44 to enable the latch release solenoid LRS circuit. Back contacts K7 open in line 61 to deenergize the relay K5. Front contacts K7 close in line 65 to seal in the relay K7 around the switching means SW20.

Cycle complete relay K8 is energized by the sensing bar out switch SW2 in line 70 which is closed by the sensing bar contacts whenever the readout has been successfully started. The switching means SW6, also in line 70, are closed whenever the printer carriage is at home or, in other words, responsive to the printer being at rest. The left side of the switching means SW6 is at ground potential whenever the commodity plate and price setting interlock is operated maintaining the sealing circuit for the commodity and price interlock through price and name relay contacts K3 in line 55 when closed. Contacts K8 in line 45 are closed to further enable the print solenoid PS in line 49. Back contacts K8 open to deenergize the relay K4 in line 58. This drops out wheel release relay K7 through the opening of contacts of K4 in line 64. Relay K7 is deenergized thus opening its contacts K7 in line 44 and dropping out the latch release solenoid LRS, also in line 44. The latch release solenoid operation thus may be a one revolution clutch. Back contacts K8 open in line 60 to disable an energizing circuit for scanner control relay K5. Contacts K8 close in line 71 providing a seal-in circuit for the relay K8 in line 70. The cycle complete relay K8 stays energized until one print operation is initiated. When the print operation is initiated the carriage home switching means SW6 in line 70 is moved from its position shown in the drawings to a contact position directly below, causing K8 to drop out. Thus the seal circuit provided by contacts K8 in line 71 is broken.

When the printer carriage starts to move the movement of the carriage home switching means SW6 in line 70 from its upper contact to its lower contact energizes take-label relay K9. Contacts K9 in line 72 close sealing in the relay K9. Front contact K9 in line 36 closes lighting the "take-label" lamp 16. Back contacts K9 in line 44 open disabling the latch release solenoid circuit and interlocking it whereby readout cannot be accomplished from the readout wheels while a printing cycle is in operation. This interlock is further assisted by the switching means SW5 which is opened except when the printer carriage is back home or the printing cycle is completed. Back contacts K9 in line 49 open disabling the print solenoid circuit. When the activator is pressed to prepare a label for attachment to a package the switching means SW10 is operated in line 72 dropping out the relay K9.

A memory function of the circuit should be noted in that the start cycle relay K4 can be pulled in by a new "no-motion" cycle. With a new cycle the relay K4 can be pulled in and seal in through contacts K4 in line 58; however, the scanner control relay K5 will not be operated until the scanner returns to its home position, if it is not already there. After the scanner returns to its home position the same operation described hereinbefore can proceed until the wheel release relay K7 is pulled in. However, contacts K7 in line 44 are not operative to initiate the mechanical readout cycle through the latch release solenoid LRS since the take-label relay back contacts K9 in line 44 are still open since a label has not been taken. It should be noted that take-label switching means SW11 in line 49, which is not closed until the label activator is released, requires that no printing be done until the activator is released since it would be possible then to print a second label and have the second label down before the previous label had been released. The take-label switching means SW11 opens before the take-label switching means SW10 so that the print solenoid PS is not unblocked before the activator is released, through the back contacts K9 in line 49.

With the control circuit described herein the computing scale reads out only the last scan so that if the label is not taken, regardless of the number of scanning cycles, only the last value has been stored. Operation of the motion detector relay K10 during the cycle drops out the scanner control relay K5 by opening the back contacts K10 in line 61. When this happens back contacts K5 close and front contacts K5 open in line 16 reversing the direction of operation of the scanner motor SM1 which, when the scanner reaches its home position, will provide a new scan if the motion has stopped and the back contacts K10 in line 61 are closed.

The reset pulse required for resetting the counters may be provided by the closure of K6 front contacts. The closure of K6 contacts is also advantageously utilized to provide a reset signal for the check circuitry flip flop.

*Sequential operation*

The just described circuit connections and details of individual operation should be considered in the overall pattern of sequential operation, since the invention provides additional advantages in said sequence. Therefore, the normal operation of the embodiment of the electronic computing scale will be described in a series of steps. Reference to FIG. VI will help clarify the relative times of component operation.

Assume that the power is off; the housing door is closed; the printer mode switch is in position number one of the following positions: (1) off, (2) on, (3) demand, and (4) continuous; the activator is off; no labels in the machine; no commodity plate in the machine; and that the scanner, sensing bar, and printer carriages are in "home" position. All relays are deenergized. The following cam operated switches are operated: SW1, SW3, SW5, SW6, SW15, SW16, SW18, SW19, and SW21. The remainder of the SW series are not operated and are in their normal positions.

Sequence step number 1: The main power switch SW27 (A and B) is manually closed to the "ON" position. The motor starting relay SR1 in line 18 operates to start the main drive motor B2, also in line 18. Power is applied to the primary windings of the regulated plate and filament transformers T11 and T12 in lines 20 and 28. Time delay relay K12 in line 31 is energized from a secondary winding of T12. The readout fan and computer fan motors B3 and B4 in lines 17, 19, are started. The scanner and scale projection lamps l1 and l2 in lines 23, 22 are turned on. Lamp l4 in line 35 lights to indicate that the price and name should be set. Lamp l5 in line 33 lights to indicate that labels should be inserted. The check circuit output relay is energized. Change commodity relay K2 in line 52 is energized and seals in through K2 contacts in line 52.

Sequence step number 2: The activator switch SW23 is turned to the "ON" position and the activator heat element HR1 is thus turned on in line 12.

Sequence step number 3: A ticket supply is inserted in the printer. Paper supply switches SW7 and SW14 in lines 33, 49, are operated. The operation of SW7 extinguishes the add labels lamp I5 in line 33. Housing door interlock switch SW15 in line 18 interrupts the supply to the scanner motor SM1 and the main drive motor B2 in lines 13 and 18 while the housing door is open.

Sequence step number 4: The mode of operation of the printer is chosen. Assume that regular operation is desired so that the ganged four arms are manually turned to the "ON" position.

Sequence step number 5: A commodity plate or knob is inserted or operated. Commodity plate switch SW8 in line 54 is operated, breaking the original energization circuit for the change commodity relay K2 in line 52.

Sequence step number 6: The price per pound is changed, operating price change switch SW9 (during the change only). The operation of SW9 energizes the change price relay K1 in line 50 which seals in through contacts K1 in line 51. Since the change price and change commodity relays K1 and K2 are now energized, if the tare interlock provisions are not utilized, the price and name relay K3 in line 54 is energized, as hereinbefore described, extinguishing set price and name lamp I4 in line 35 by the opening of back contacts K3.

Sequence step number 7: If the tare interlock provisions are utilized then the tare must go to zero and be set as described, before energization of K3. When the tare is set tare switch SW16 is removed from the operated position and lamp I3 lights in line 34 indicating that the tare has been set.

Sequence step number 8: Time delay relay K12 at line 31 times out closing contacts K12 at line 24 to supply power to the plate transformer T13. Lamp I7 at line 26 then lights through back contacts K5 and K10 and recently closed price and name relay contacts K3.

Sequence step number 9: Weight is placed on the platter or commodity receptacle. Motion detection relay K10 is enregized. Contacts K10 at line 57 close energizing start cycle relay K4. Contacts K4 close at line 58 to seal in relay K4. Back contacts K4 at line 51 open deenergizing the change price and change commodity relays K1 and K2. The price and name interlock is not disturbed because of its seal-in contacts K3 at line 55. Back contacts K10 at line 26 open extinguishing ready lamp I7.

Sequence step number 10: Motion of the platter ceases. Motion detector relay K10 is deenergized. Scanner control relay K5 at line 61 is energized as back contacts K10 close since front contacts K4 have just previously been closed. Back contacts K5 in line 26 open maintaining lamp I7 dark even though back contacts K10 close. Scanner start relay K6 in line 62 is energized by the closing of front contacts K5 in line 63. The closing of front contacts K6 in line 15, the opening of back contact K5, and the closing of front contacts K5 in line 16 starts the scanner motor for movement in the forward direction. Contacts K6 (not shown) close to provide reset pulses to the computer circuits and to the check circuitry.

Sequence step number 11: The scanner moves off "Home" position. Scanner gate switch SW21 in line 73 returns to normal position (closed) allowing pulses to shaper gate circuit. Scanner home switch SW19 in line 62 returns to a non-operated position providing a seal-in circuit for scanner start relay K6 until the scanner returns to "Home" position.

Sequence step number 12: The scanner reaches the "out" position. Scanner gate switch SW21 in line 73 is opened to close the gate to the computer. The scanner "out" switch SW20 is operated in line 64 energizing wheel release relay K7 through previously closed K4 front contacts and back contacts K10. Scanner control relay K5 is deenergized by the opening of back contacts K7 in line 61. Latch release solenoid LRS is energized by the closure of front contacts K7 in line 44. Scanner motor travel is reversed by the closing of back contacts K5 and the opening of front contacts K5 in line 16. The closing of K5 back contacts in line 26 lights the ready lamp I7, indicating that the scanning portion of the cycle has been completed and the electronic computing scale is ready to receive another weight to be weighed and the information stored.

Sequence step number 13: The sensing bar of the mechanical readout leaves "Home" position. The sensing bar no longer operates switch SW1 series. An SW1 switch (not shown) opens to prepare the check circuit. When the sensing bar reaches the "middle" position a switch SW3 (not shown) is no longer operated turning off the trigger (latch) solenoid power. The indicator wheels are now in motion.

Sequence step number 14: The sensing bar reaches the "out" position operating switch SW2 energizing cycle complete relay K8 at line 70. Back contacts K8 at line 57 open deenergizing start cycle relay K4. Front contacts K4 at line 64 open deenergizing wheel release relay K7. Latch release solenoid LRS is denergized by the opening of contacts K7 at line 44.

Sequence step number 15: The sensing bar leaves the "out" position removing operation of the switch SW2 in line 70 opening the switch.

Sequence step number 16: The scanner leaves the "out" position removing operation of first the scanner "out" switch SW20 and then the scanner gate switch SW21 in lines 64 and 73.

Sequence step number 17: The sensing bar reaches the "check" position operating sensing bar "middle" switch SW3 thereby restoring power to the trigger circuit. The indicator wheels stop moving.

Sequence step number 18: Indicator wheels check electrically. The check circuit relay K11 is deenergized by the check circuit amplifier. The mechanical check solenoid MCS is energized by the closure of the check circuit relay back contacts K11 in line 41 and the sensing bar leaves the check position.

Sequence step number 19: The indicator wheels check mechanically as the sensing bar goes into the "home" position operating the switch SW1 series and thereby energizing the check circuit relay K11. Check circuit relay back contacts K11 in line 41 open deenergizing the mechanical check solenoid MCS. An SW1 switch in line 49 is closed to energize print solenoid PS.

Sequence step number 20: The printer carriage leaves the home position removing operation of the carriage home switches SW5 and SW6. The switch SW5 in line 44 thus deenergizes the print solenoid PS. The switch SW6 is then operative to deenergize the cycle complete relay K8 in line 70 while energizing the take-label relay K9 in line 72. Contacts K9 in line 72 close sealing in relay K9. Front contacts K9 close in line 36 to light the take label lamp I6.

Sequence step number 21: The scanner returns to the "home" position operating scanner gate switch SW21 in line 73, and also operates switch SW19 in line 62 deenergizing scanner start relay K6. Front contacts K6 open in line 15 to stop the scanner motor travel.

Sequence step number 22: A label is printed, cut off and delivered. The printer carriage returns to the "home" position and operates switches SW5 and SW6.

Sequence step number 23: The weight or package is removed from the scale operating zero switch SW18 in line 57. The activator is actuated operating switches SW10 and SW11 in lines 72, 49. Take label relay K9 is deenergized by the opening of switch SW10, opening front contacts K9 in line 36 thereby extinguishing take-label lamp I6.

Sequence step number 24: The label is removed and placed on the package. The activator is released removing the operation of switches SW10 and SW11.

There has just been described a complete cycle of the embodiment of the electronic computing scale illustrated herein. Although in the above example the package was not removed until step 23 in its most important to note that the electronic computing scale was ready to have the first package removed and to receive a second package any time after the scanner reached the "out" position in step 12 and the scanner control relay K5 was deenergized, lighting the ready lamp I7. It is thus possible to weigh the second package while the label for the first package is being printed, cut off, and delivered. This is possible because of the control means sequencing just described and the use of multi-data storage means. That is, the information may be stored either in the computer or the printer. There are interlocks described to coordinate the two storage means. The multiple storage element reduces the weighing time per package, an important item in pre-packing foods for today's supermarkets or in other applications where assembly line weighing techniques are needed.

The optical readout techniques utilized here for the first time in combination with digital computing in an electronic computing scale add to the speed and reliability of the system. The optical readout requires no physical attachment to the weighing mechanism and is able to provide an almost uniform operating cycle regardless of the weight of the package. The system utilizes the check circuitry described to add to the reliability of the system, again without appreciably reducing the speed of the weighing. The motion detector means cooperates with the system in a novel manner to again reduce the weighing time and improving reliability. The electrical interlocking provides a less expensive approach than mechanical interlocking, reduces mechanical maintenance problems and thus is more reliable while also adding to the speed of the weighing cycle.

The readout and printer section described cooperates well with the system. The various positions of the printer mode switch SW25 provide (1) an "off" position where the weight may be read from a visual indicator without a ticket being printed, (2) an "on" position where a ticket is printed bearing the weight, value, grade, etc., for each package, (3) a "demand" position to provide a ticket only on demand, and (4) a "continuous" position which allows the printing of a plurality of identically marked tickets.

In summary, the scale and motion detector control the scanner. The scanner completely controls the computer. The scanner and the readout are mutually interlocked so that one cannot operate while the other is operative. The scanner and the ticket switch jointly control the starting of a readout cycle. The readout controls the printer.

A normal weighing cycle is as follows. The commodity placed on the scale produces an indication and a weight value for scanning. The motion detector senses the weight change and starts the scanning cycle when motion stops. The scanner reads the weight information to the computer where the weight information is stored and the value is computed and stored. At the end of its cycle, the scanner signals the readout to begin its cycle. The readout then sets up the indication and print wheels to the values stored in the computer. At the end of the readout cycle the print cycle is automatically started and a ticket is printed.

The overall cycle is interrupted between the scanning cycle and the readout cycle unless the ticket switch is operated.

The function of the scale is straight forward. It produces an indicated weight for operator viewing and a corresponding chart indication for use by the scanner in translating the weight into its equivalent digital signal. The scale can be operated any time, but it is interlocked to the rest of the system through the motion detecor.

The motion detector senses scale motion and operates a relay. The relay is held in the operated position during scale motion and is released when there is no motion. This relay provides the basic information necessary to control the scanner and computer.

The operating cycle of the scanner and computer is under the control of the motion detector in the following manner. Whenever the scale moves to a new weight value, there is a sequence of first motion and then no motion. The scanner does not respond to the motion signal but begins its cycle when the motion stops. Each sequence of motion and then no motion causes the scanner to go through one cycle of reading the scale and feeding the weight information to the computer.

An exception to this occurs when scale motion occurs during the scanning cycle. If this happens, the weight and price information stored in the computer is in error and should not be read out.

An error circuit is activated which prevents operation of the readout mechanism and automatically returns the scanner to its home position and starts a new scan at the completion of the false scan, or when the motion stops if the motion continues after the false scan is completed. The error circuit is automatically reset by a successfully completed and uninterrupted scan.

The computer is completely under the control of the scanner. Each scan of the scanner causes it to store a new set of weight and value information. The scanner provides a reset pulse to reset the computer at the beginning of each scan and an interlock to prevent input signals to the computer, except during scan.

The readout mechanism is internally interlocked so that when it receives a signal to make a new readout it goes through its operating cycle without interruption. Its operating cycle is started by applying power to the latch release solenoid. When the sensing bar has been pulled to the out position a set of contacts is opened releasing the circuit which activated the latch release solenoid.

Two conditions are necessary to start a readout cycle. The momentary contact switch on the ticket dispenser must have been operated and a new scan must have been completed since the previous readout.

A memory circuit is provided to prepare the readout mechanism after a scan so that it can be activated by the ticket switch. Operation of the readout resets the memory circuit so that two successive readouts cannot be made without a scaning cycle in between.

If the ticket switch is operated before a new scan, it also sets up the memory circuit so that a readout will automatically occur after the next scan.

Interlock contacts are provided to keep a scanning cycle from starting during a readout cycle. A corresponding contact interlocks the readout so that a readout cycle cannot start if a scanning cycle has been started.

Each completed readout cycle starts a printing cycle unless the "no print" or "off" position of the printer mode switch is operated. Operating the "continuous" switch locks the readout and sets up the printer circuitry so that duplicate tickets are printed on a continuous cycle basis until the printer mode switch is turned "off."

The home position contacts on the readout mechanism keep the printer from being operated during a readout cycle. A contact on the printer keeps the readout mechanism from being operated during a printing cycle.

Price and commodity interlocks are provided so that the price setting knobs must be moved when the commodity plate is changed. Likewise, the commodity plate must be moved in and out or replaced if price setting knobs are moved. If these interlocks are violated, a new scanning cycle cannot be initiated until corrective action is taken.

Error lights are provided to indicate certain types of sequence failures which might result from operator interference with the machine cycle. An error light will light if price and commodity plate settings are not properly sequenced. If the scale is moved during a scanning cycle a light comes on and stays on until a new cycle is started. Another light gives warning when ticket paper is running low. In case the readout fails to read out the computer correctly an electrical check circuit prevents the issue of a ticket and lights an error light.

This is a division of application Serial No. 92,233 filed February 28, 1961, now Patent No. 3,163,247.

Having described the invention, we claim:

1. In an automatic weighing control, in combination, readout means, commodity identifying means, unit price setting means, and electrical interlock means including a first switch responsive to a change in the setting of the commodity identifying means and opened and closed independently of a change in the setting of the unit price setting means and a second switch responsive to a change in the setting of the unit price setting means and opened and closed independently of a change in the setting of the commodmity identifying means for preventing operation of the readout means unless the operation of one switch is accompanied by the operation of the other switch.

2. A device for weighing a commodity and printing data incorporating a weight factor, comprising weighing mechanism, apparatus controlled by the weighing mechanism for printing data incorporating a weight factor, comprising changeable means for printing the price per unit of weight of a commodity and changeable means for printing the name of the commodity, and an electrical control including a first switch responsive to a change in the name printing means which is opened and closed independently of a change in the price printing means and a second switch responsive to a change in the price printing means which is opened and closed independently of a change in the name printing means for preventing operation of said apparatus unless the operation of one switch is accompanied by the operation of the other switch.

3. A device for weighing a commodity and exhibiting data incorporating a weight factor, comprising weighing mechanism, a readout system for receiving weight data from the weighing mechanism, a computer for receiving weight data from the readout system and computing the value of the commodity at a preset price per unit of weight, and apparatus which is actuated in response to a change in said preset price during operation of said computer for automatically restoring said device to condition for starting a new operation.

4. A device for weighing a commodity and printing data incorporating a weight factor, comprising weighing mechanism, a readout system for receiving weight data from the weighing mechanism, a computer for receiving weight data from the readout system and computing the vaue of the commodity at a preset price per unit of weight, apparatus comprising changeable name printing means for printing the name of the computed value of the commodity, and a resetting control which is actuated in response to a change in said name printing means during operation of said computer for automatically restoring said device to condition for starting a new operation.

5. A device for weighing a commodity and printing data incorporating a weight factor, comprising weighing mechanism, apparatus controlled by the weighing mechanism, having changeable name printing means, for printing the name of the commodity and data incorporating a weight factor, a control which is actuated by interruption of power for preventing operation of said apparatus upon restoration of power, and a resetting device which is actuated in response to a change in said name printing means for restoring said control to its non-actuated condition.

6. A device for weighing a commodity and exhibiting data incorporating a weight factor, comprising weighing mechanism, a computer for receiving weight data from the weighing mechanism and computing the value of the commodity at a preset price per unit of weight, a control which is actuated by interruption of power for preventing operation of said computer upon restoration of power, and a resetting device which is actuated in response to a change in said preset price for restoring said control to its non-actuated condition.

7. A device for weighing a commodity and printing data incorporating a weight factor, comprising weighing mechanism, apparatus controlled by the weighing mechanism for printing data incorporating a weight factor, comprising changeable means for printing the price per unit of weight of a commodity and changeable means for printing the name of the commodity, and a control which operates to prevent said apparatus from being operated to print a new price by changing said price printing means unless said name printing means are also changed.

8. A device for weighing a commodity and printing data incorporating a weight factor, comprising weighing mechanism, apparatus controlled by the weighing mechanism for printing data incorporating a weight factor, comprising changeable means for printing the price per unit of weight of a commodity and changeable means for printing the name of the commodity, a control which is actuated in response to a change in said price printing means for preventing operation of said apparatus, and a resetting device which is actuated in response to a change in said name printing means for restoring said control to its non-actuated condition.

9. A device for weighing a commodity and printing data incorporating a weight factor, comprising weighing mechanism, a computer for receiving weight data from the weighing mechanism and computing the value of the commodity at a preset price per unit of weight, apparatus controlled by the computer for printing said price and said value, comprising changeable means for printing also the name of the commodity, and a control which operates to prevent said apparatus from being operated to print a new preset price unless said name printing means are changed.

References Cited by the Examiner

UNITED STATES PATENTS

| | | | |
|---|---|---|---|
| 2,803,448 | 8/57 | Biebel | 177—3 |
| 2,921,780 | 1/60 | Allen | 177—212 |
| 2,948,464 | 8/60 | Allen | 235—58 |
| 2,948,465 | 8/60 | Allen | 235—58 |
| 2,948,466 | 8/60 | Allen et al. | 235—58 |
| 2,948,523 | 8/60 | Allen | 177—12 |
| 2,963,222 | 12/60 | Allen | 235—58 X |
| 2,974,863 | 3/61 | Williams et al. | 177—3 X |
| 3,042,128 | 7/62 | Bell et al. | 177—210 |
| 3,044,691 | 7/62 | Allen | 235—58 |
| 3,045,229 | 7/62 | Allen | 340—347.4 |
| 3,055,585 | 9/62 | Bell et al. | 235—61 |
| 3,071,318 | 1/63 | Allen | 235—58 |
| 3,103,253 | 9/63 | Williams | 177—187 |
| 3,105,940 | 10/63 | Bell et al. | 328—132 |

LEYLAND M. MARTIN, *Primary Examiner.*